Jan. 26, 1937. P. R. ARONSON 2,068,837
INLET NIPPLE SCREEN ADAPTER
Filed July 5, 1933

INVENTOR.
PETER R. ARONSON
BY
ATTORNEY

Patented Jan. 26, 1937

2,068,837

UNITED STATES PATENT OFFICE 2,068,837

INLET NIPPLE SCREEN ADAPTER

Peter R. Aronson, Millburn, N. J., assignor, by mesne assignments, to Union Carbide and Carbon Corporation, a corporation of New York Application July 5, 1933, Serial No. 679,099

10 Claims. (Cl. 210—164)

This invention relates to adapters for use in connecting valves, regulators and similar mechanisms with conduits leading from a source of fluid supply.

It is generally advisable to insert filtering means, such as one or more screens, in the fluid supply conduit leading to mechanisms, such as valves and regulators, to exclude particles of foreign material from the latter, which particles otherwise often damage or interfere with the proper functioning of such mechanisms. After periods of service such filtering means become more or less clogged and may require repairs or replacement.

The principal object of this invention is to provide an adapter in which the filtering means may be securely retained but from which the same may be readily removed, when desired, for cleaning, repairs or replacement.

Another object is to provide an improved inlet adapter for valves, regulators and the like, so constructed that the force applied in connecting the adapter to a gas supply line shall not render inoperative the device for securing the filtering means in place.

Figure 1:
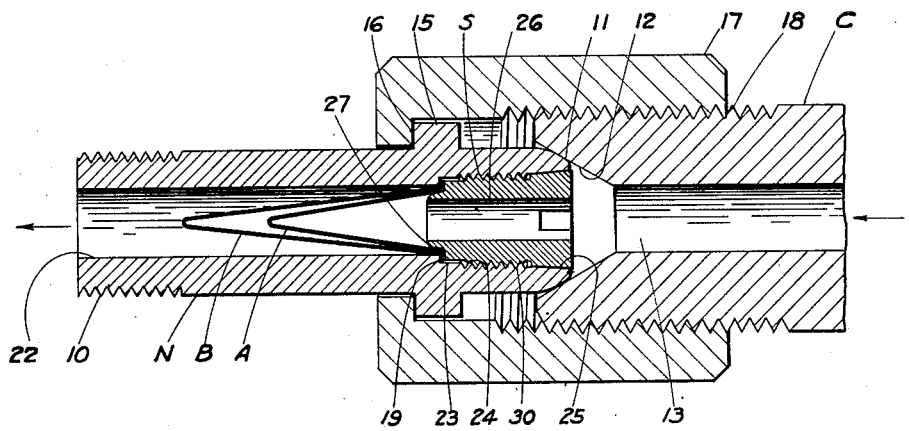
Figures 2, 3:
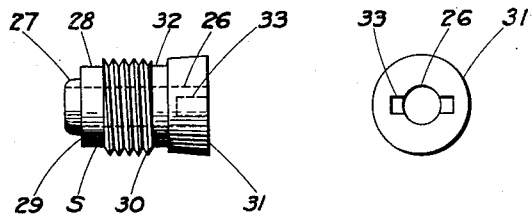
Figure 4:
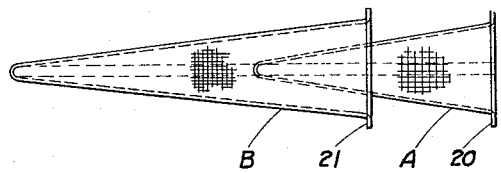

The above and other objects and the novel features of this invention will be apparent from the following description and accompanying drawing, of which Fig. 1 is a cross-sectional view showing the screens and a locking member as assembled within an adapter or nipple;

Figs. 2 and 3 are a side view and an end view respectively, of the locking member; and Fig. 4 is a view showing the screens before assembly.

As shown, the improved adapter may consist of a nipple N, of metal such as bronze, having an axial bore therethrough containing suitable filtering means, such as the nested conical metal screens A and B, and a retaining device for the latter, such as the locking screw S. At its outlet end the nipple N may have means, such as an externally threaded portion 10 to couple it to a valve or regulator, and at its inlet end the nipple may be provided with means, such as in external inclined and rounded annular seat 11, to cooperate with seating means, such as a conical counterbore 12 at the end of a passage 13 in a conduit C connected to a source of compressed gas or other fluid under pressure. Between its ends, the nipple N may be provided with an external collar 15 to form a bearing shoulder for the inturned end 16 of a nut 17 which is internally threaded at its other end to engage the exterior threads 18 on the conduit C, whereby the nipple N may be detachably coupled to the conduit C and the seat 11 may be secured in gas-tight contact with the seat 12.

As shown, the bore of the nipple is counterbored inwardly from its inlet end to provide a shoulder 19 which is in the same plane as the collar 15. This shoulder 19 serves as a bearing and retaining surface for the superposed flanges 20 and 21 formed at the bases of the nested conical screens A and B; and the counterbore is constructed to receive and retain the locking screw S which clamps the screen flanges tightly against the shoulder 19. The conical portions of the nested screens are preferably of different height and project into the smaller diameter 22 of the bore, and the screen A is preferably of coarser mesh than the screen B so that the larger foreign particles will be removed first on the screen A as the gas flows in the direction of the arrow through the successive screens.

The surface of the counterbore, for a short distance outwardly from the shoulder 19, is plain, as at 23; beyond this, for a substantial distance, the counterbore is internally threaded, as at 24; and then it flares outwardly, as at 25, from the end of the threaded section 24 to the inlet end adjacent the inner edge of the seat 11.

The locking screw S cooperates with the several parts of the counterbore in the nipple and also with the screens A and B, to center the latter and hold them firmly in place; to prevent mutilation of the inlet end of the nipple; and to provide for easy removal and replacement of the locking screw and the screens.

As shown in Figs. 1 and 2, the screw S, which may be of metal such as bronze, has a fluid passage 26 therethrough which is located axially in line with the passages 13 and 22 when this screw is secured in the nipple. At its inner end, the screw S has a central annular boss or projecting lip 27, and back of this boss, the screw has a smooth cylindrical section 28 of larger diameter than the boss but smaller in diameter than the counterbore, leaving a shoulder 29 between the boss and the section 28. The boss 27 fits within the flanges 20, 21 of the screens and centers the latter, the periphery of the boss being tapered and rounded to avoid damaging the screens. The shoulder 29 cooperates with the shoulder 19 of the nipple to clamp the flanges 20, 21 and thereby secure the screens in position. Beyond the section 28, the screw S is provided with an externally threaded section 30 adapted to interengage with the threaded part 24 of the counterbore to lock the screw in the nipple and to exert sufficient pressure against the flanges 20, 21 to tightly clamp them between the shoulders 19 and 29.

At its outer end the screw S is provided with a frusto-conical head 31 which is connected to the threaded section 30 by a smooth neck 32 of about the same diameter as the cylindrical section 28. It is an important feature of this invention that the inclined peripheral surface of the head 31 has the same inclination as the outwardly flaring part 25 of the counterbore; and that the outer end of the head 31, when the screw is tightly in clamping position, is substantially flush with or projects slightly outside the inlet end of the nipple. When coupling a nipple adapter of this general type to a fitting, such as the conduit C, the nut 17 must be turned up quite tightly to obtain a gas-tight joint between the seats 11 and 12 but, in doing this, too much pressure is often applied to the nut 17. Then the pressure exerted on the inclined face 12, and by the latter on the seat 11, eventually squeezes the nose or inlet end of the nipple inwardly and would bind the locking screw and render it very difficult to remove the latter, if no provision were made to prevent such mutilation. The difficulty just mentioned is overcome by the present invention because the construction and shape of both the inlet end of the nipple and the locking screw are such that any excessive pressure applied to the nose of the nipple will not cause the side of the locking screw to become bound in the counterbore nor upset the nose of the nipple over the head of the screw.

A slot or groove 33 may be made in the head of the locking screw S so that a screw driver or other convenient tool may be employed to tighten the screw in place in the nipple N after the screens have been inserted within the bore.

While an improved adapter embodying this invention has been disclosed in detail, it will be understood that certain parts may be used without others, e. g. in some non-filtering adapters a plug similar to the screw S may be used without the screens to counteract the mutilation of the nose of the adapter by excessive pressure applied by the nut 17. Numerous other changes may be made in the construction disclosed without departing from the principles of my invention.

I claim:—

1. An adapter of the class described having an inclined exterior seating surface at one end and a bore extending through said adapter and terminating in an outwardly flaring portion adjacent such seating end; filtering means in said bore; and a device for retaining said filtering means in place, said device having a frusto-conical portion for fitting within said flaring portion.

2. An adapter having a tapered end margin and having a bore extending therethrough and counterbored at the said end to provide a shoulder within said bore; the counterbore having an internally-tapered portion adjacent the said tapered end of the adapter; filtering means within said bore; and a device in said counterbore for retaining said filtering means against said shoulder, said counterbore and said device having interlocking portions, and said device having an unthreaded frusto-conical head adjacent the said tapered end of the adapter in close fitting engagement within said counterbore to facilitate the removal of said device.

3. An adapter having its exterior surface tapered inwardly toward its inlet end, and having a bore extending therethrough and counterbored at one end thereof to provide a shoulder within the bore, the counterbore having a flared unthreaded portion at the end thereof opposite the shoulder; filtering means within the bore and having a flange adapted to rest on the shoulder; a locking screw threadedly secured in the counterbore and clamping the flange against said shoulder; said locking screw having a projecting lip and a tapered and rounded peripheral margin for centering the filtering means, and having an unthreaded frusto-conical head closely fitting within the flared portion of the counterbore, with its outermost margin extending at least as far as the outer margin of the latter.

4. An adapter for connection between a fluid container outlet and a valve mechanism or the like, comprising a nipple having a bore therethrough counterbored at its inlet end, the counterbore having a threaded portion intermediate its ends and an unthreaded portion tapering outwardly from the threaded portion to the inlet end of the counterbore; filtering means within the bore; and means for clamping the filtering means within the bore, said clamping means corresponding in shape to the counterbore and having an unthreaded portion corresponding to the unthreaded portion of the counterbore.

5. In combination, a member having a recess in the outlet end thereof; a nipple detachably secured thereto so that its inlet end is projected into said recess; means for effecting a squeeze fit between the inlet end of the nipple and the outlet end of the said member; said member and nipple having aligned bores; filtering means detachably positioned in the bore of the nipple; clamping means threaded into and conforming with the bore of the nipple for holding said filtering means in place, the bore of the nipple and the clamping means being unthreaded opposite the region of the squeeze fit.

6. The combination of a nipple having a bore extending therethrough and having an internally- and externally-tapered end portion; the said nipple being counterbored at one end thereof to provide a shoulder within the bore; a plurality of nested conical screens having flanged bases adapted to rest against said shoulder; each conical screen having a mesh finer than that of the conical screen situated within it; and means for forcing said screens against said shoulder, the last-named means having a portion cooperating with the said internally-tapered portion of the nipple.

7. The combination of a nipple having its exterior surface tapered inwardly toward its inlet end and having a passage therethrough provided with an unthreaded internally-tapered end portion; a shoulder in the passage; a plurality of nested screens provided with flanged bases adapted to rest against said shoulder, the outer screen of said nested screens being of finer mesh than the inner screen; and means for forcing said screens against said shoulder, the last-named means having a tapered unthreaded portion cooperating with the said internally-tapered portion of the nipple and having its outermost margin extend at least as far as the outer margin of the nipple.

8. The combination of a nipple member having a bore extending therethrough and counterbored at one end thereof to provide a shoulder within the bore, the counterbore being threaded intermediately of its ends and being tapered between the threaded area and the end of the bore; a plurality of nested screens having flanged bases supported by said shoulder; and means including a locking screw secured within the counterbore and adapted to engage the threaded portion thereof for holding said screens against said shoulder, said locking screw being tapered adjacent its head end to conform to the tapered portion of the counterbore.

9. The combination of a metal member having a tapered end margin; a passage through the member and enlarged at the end thereof adjacent the said tapered margin; a shoulder in the passage; a plurality of screens supported against the shoulder; and a locking member threaded into the passage and having an enlarged unthreaded head adapted to fit the enlargement of the passage adjacent the said tapered margin of the said metal member and having its outermost margin extend at least as far as the outer margin of the said metal member, the locking member having areas operatively bearing against the wall of the passage and against said shoulder for retaining said screens in place.

10. The combination of a fitting having a passage provided with a tapering seat; an adapter having a bore therethrough and a nose at one end thereof comprising an exterior seating surface adapted to fit said tapering seat; means for coupling said adapter to said fitting to produce a fluid-tight joint between said seating surface and said seat; and means comprising a nut having a frusto-conical head cooperating with an outwardly flaring portion of the bore of said adapter to counteract the mutilation of said nose by excessive pressure applied by such coupling means.

PETER R. ARONSON.